(12) United States Patent  
Taunton

(10) Patent No.: US 7,020,188 B2  
(45) Date of Patent: Mar. 28, 2006

(54) MULTI-TONE TRANSMISSION

(75) Inventor: Mark Taunton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 762 days.

(21) Appl. No.: 09/921,757

(22) Filed: Aug. 6, 2001

(65) Prior Publication Data

US 2003/0026331 A1     Feb. 6, 2003

(51) Int. Cl.  
H04B 1/38     (2006.01)

(52) U.S. Cl. .................................................. 375/222

(58) Field of Classification Search ................ 375/233, 375/287, 288, 296, 229, 230, 231, 232, 222, 375/219, 286, 295, 377; 324/518; 340/146.2; 370/465, 344, 464; 379/399.01, 414; 455/91  
See application file for complete search history.

(56) References Cited

U.S. PATENT DOCUMENTS

| | | | |
|---|---|---|---|
| 4,679,227 A | | 7/1987 | Hughes-Hartogs ........... 379/98 |
| 4,831,637 A | * | 5/1989 | Lawrence et al. .......... 375/371 |
| 5,361,400 A | * | 11/1994 | Kazecki et al. ............ 455/63.1 |
| 5,768,318 A | | 6/1998 | Mestdagh .................. 375/296 |
| 6,009,073 A | * | 12/1999 | Kaneko ...................... 370/203 |
| 6,141,378 A | * | 10/2000 | d'Oreye de Lantremange .......... 375/232 |
| 6,215,354 B1 | | 4/2001 | Kolanek et al. |

| | | | |
|---|---|---|---|
| 2001/0040869 A1 | * | 11/2001 | Moss .......................... 370/203 |

FOREIGN PATENT DOCUMENTS

| | | |
|---|---|---|
| EP | 1 104 140 | 4/2001 |
| EP | 1104140 A2 * | 5/2001 |
| EP | 1175056 A1 * | 1/2002 |
| WO | WO 99 18662 | 4/1999 |
| WO | WO 99/18662 | 4/1999 |
| WO | WO 00 72543 | 11/2000 |

OTHER PUBLICATIONS

G. Redaelli et al., "Analysis of Two Digital Adaptive Pre-Correctors for Nonlinearity in OFDM Systems", *IEEE International Conference On Communications—Conference Record*, vol. 1, pp 172-177, Jun. 6, 1999.

European Search Report, dated Nov. 14, 2002, issued by the European Patent Office (4 pages).

"Low-Power ADSL Central-Office Line Driver," Texas Instruments, Dallas, Texas, Apr. 1999—Revised May 2001, pp. 1-31.

* cited by examiner

*Primary Examiner*—Mohammed Ghayour  
*Assistant Examiner*—Pankaj Kumar  
(74) *Attorney, Agent, or Firm*—Sterne, Kessler, Goldstein & Fox, P.L.L.C.

(57) ABSTRACT

A multi-tone modem processes an input data stream 10 and uses an inverse Fourier transform 24 to produce a stream of multi-tone symbols 26 fed to an analogue front end 146. A model 32 models the subsequent processing in the analogue front end 146 and outputs a control signal 184 that controls the analogue front end 146 accordingly.

12 Claims, 3 Drawing Sheets

MULTI-TONE TRANSMISSION

FIELD OF INVENTION

The invention relates to multi-tone transmission, particularly for transmitting digital data.

Two commonly assigned patent applications in the name Mark Taunton, filed on the same date as the present application, each also entitled "Multi-tone transmission", and with reference numbers BP1755 US and BP1756 US are incorporated herein by reference.

BACKGROUND ART

A system using multiple tone signalling generally uses the Fourier Transform and its inverse to convert the information between time and frequency domains. Two examples of this type of modulation scheme are: (a) DMT (Discrete Multi-Tone) as used in systems such as ADSL (Asymmetric Digital Subscriber Loop); and (b) COFDM (Carrierless Orthogonal Frequency Division Multiplex), a standard widely adopted for digital terrestrial TV broadcasting.

In these systems, the data to be transmitted are subdivided (multiplexed) across a number of distinct frequencies (sometimes also referred to as tones or sub-carriers) which are all integer multiples of a fixed basic frequency. The individual tones making up the group are spaced apart by this basic frequency. (In the case of COFDM the group of tones is then shifted up to a much higher frequency range for transmission from an aerial, but that detail is not relevant to the discussion here.) The number of tones used in different systems and within an individual system can vary, anywhere from 10 or so; e.g. for a low bandwidth ADSL upstream link, up to several thousand, e.g. an "8K-carrier" COFDM digital TV transmission.

The key algorithm common to the communication systems under consideration is the Fourier Transform, a mathematical scheme in which a time-varying signal is represented not as a set of values in time but as the sum of a set of sinusoidal waveforms. Each sinusoid in the set has a distinct frequency which is an integer multiple of a base frequency called the analysis frequency. Fourier Transform theory shows that any varying signal can be alternately represented in this way, by defining the unique set of amplitude and phase values for the individual sinusoids which sum together to form the signal wave-shape.

In the general (continuous) case, the size of the set of sinusoids is infinite and the spacing of the individual frequencies is infinitesimal. However the particular type of Fourier Transform used in practical communications systems is the Discrete Fourier Transform (DFT). The term 'discrete' is used because the data is processed as a set of distinct samples, not a continuous signal. When a finite sequence of samples is transformed in this way, the size of the set of sinusoids that represent the signal in the frequency domain is also finite. Hereafter, when the Fourier Transform is mentioned, the term 'discrete' should be assumed.

In summary, the normal ("forward") Fourier Transform is used to convert from a series of samples taken in the time domain into an equivalent representation of the same information, namely as a series of values in the frequency domain, describing the amplitude and phase of each of a set of harmonically related sinusoidal waveforms. The reverse process, the Inverse Fourier Transform, performs the opposite operation, summing the waveforms described by the individual amplitude and phase values to re-create a composite waveform as a series of samples in the time domain.

The Fourier Transform and its inverse are relatively complex functions, but they may be implemented without difficulty using well-known algorithms on a digital signal processor. In particular, highly efficient versions of the transforms are known, commonly called the Fast Fourier Transform (FFT) and the Inverse FFT or IFFT, which operate on sample sequences whose lengths are powers of 2, e.g. 256 points or 512 points.

The FFT and IFFT together provide for efficient encoding and decoding of signals. In a transmitter, a set of data bits may be encoded by the IFFT, choosing particular combinations of amplitude and phase for each of the constituent frequency components to represent different data values. After all the data is encoded into the amplitude and phase of each constituent tone, the IFFT is performed to create a time-domain signal which is then transmitted.

For example, it is possible to encode 2 bits of data, representing 4 different possible values (00, 01, 10, 11), on to one tone by simple quadrature modulation, where the amplitude is held constant and four distinct phase values (e.g. +45, +135, +225, +315 degrees, i.e. 90 degrees apart) represent the 4 different combinations. More complex mappings are possible (allowing more bits to be encoded on one tone) using more phase values, or combinations of different amplitudes as well as phases. In practical systems, modulation of one tone can be varied so as to represent as many as 15 or 16 bits in the best case (using 32768 or 65536 distinct combinations of amplitude and phase). Therefore in systems using hundreds of tones, some thousands of bits can be carried in each symbol in good circumstances.

The (forward) FFT is used at the receiver to reverse the process. Once time synchronization with the transmitted waveform has been achieved and equalisation for frequency-dependent phase and amplitude changes (inevitable in the transfer of the signal from transmitter to receiver) has been performed, the FFT is applied to the set of samples making up each received symbol, to reconstruct values of amplitude and phase for each of the tones in use. In general the values obtained by this process are not exactly the same as were initially encoded, for various reasons, including particularly the presence of noise introduced along the transmission path of the signal. Noise is unavoidable in any practical system. However, by applying various techniques to compensate for errors caused by noise, the original data may be recovered with an acceptable level of reliability, provided the system has been configured appropriately, taking into account the signal-transfer characteristics of the transmission path.

In order to ease the work of the receiver in equalizing the received signal for the effects of the transmission route, it is common to insert a short delay between consecutive symbols transmitted. In ADSL, this delay period is called the "cyclic prefix time", in which what is transmitted is a portion of the signal extracted from the end of the immediately following symbol. The name "cyclic prefix" time derives from the fact that the short sequence has been used as a prefix to the new symbol and is cyclically congruent with it. Note that after equalization, the signal received during the cyclic prefix time is ignored by the receiver. In COFDM, the delay period is called the "guard time"; no signal is transmitted during this time.

The IFFT-FFT (encoding-decoding) process provides for great flexibility in the communications system. Different frequencies in the spectrum covered by the set of tones may have different characteristics in respect of noisiness and attenuation over the communication link (e.g. the phone line in the case of an ADSL system). By varying the encoding details tone by tone, this may be accounted for, so as to maximize the number of bits carried by the symbol in total, even when a particular single tone can only carry a small number of bits. U.S. Pat. No. 4,679,227, which describes multi-tone encoding schemes, presents techniques for accomplishing this.

One property of this type of signal encoding is particularly relevant. The waveform resulting from the IFFT can in principle have very large peak values in it—relative to the average amplitude of the signal as a whole—at points where the particular phases of the individual tones happen to sum together in the same direction. For example, if all tones were using encoded simple 2-bit quadrature modulation, and all the data bits being modulated were zero (or more generally if the same pair of bit values were modulating each tone), then at the start of the time domain symbol created by the IFFT there would be a high amplitude "spike", since each component waveform would have a real positive value 0.707 times its peak amplitude, and these would all sum together in the same direction. By contrast, if there is a general haphazard distribution of 1's and 0's in the data, the expected peak value in the average symbol would be much lower, although once in a while peaks will still occur.

On observing the output from a sequence of IFFT operations used to encode a (generalised) data sequence for transmission, the signal is seen to have a sample amplitude distribution which is very like random noise, when considered on a statistical basis. The most frequently occurring sample amplitudes are those near zero (the central point—the distribution is symmetrical either side of zero). Higher amplitudes are less likely, but still occur, and there is a gradual reduction in likelihood of occurrence with increasing amplitude. The very highest sample amplitudes which can occur—unlike with true noise there is a finite limit because we use a discrete IFFT over a finite number of tones—are still many times higher than the average signal amplitude; however, such values occur only extremely infrequently.

The overall statistical properties of the sequence are complex. However, one simple measure of the properties of signals generally is their crest factor. The crest factor of a repetitive signal is defined as the ratio of its peak amplitude to its average (RMS) amplitude. Different types of waveforms can have very different crest factors, depending on their shape. For example a simple pulse waveform, where the signal jumps between just two levels +A and −A, has a crest factor of 1, i.e. the average and peak levels of the signal are the same. A simple continuous sine wave has a crest factor of $\sqrt{2}$ (1.4142135 . . . ). Other wave shapes can be envisaged having widely differing crest factors.

When we are dealing with irregular (non-repeating) signals, such as the output from an IFFT process applied to a random stream of data, the definition of crest factor is adjusted. This is necessary, in order to take into account the statistical spread of amplitude values. In such cases we define the effective crest factor to be the ratio of a threshold level to the average (RMS) level of the signal overall, where the threshold level is that which only some particular small fraction (e.g. $1/10,000,000^{th}$, or $10^{-7}$) of the generated samples will equal or exceed.

With signals created by an IFFT-based modulator, in general, systems in which few tones are used will have a smaller effective crest factor than systems with large numbers of tones. In a typical ADSL system, using 220 tones on the downstream path, the effective crest factor is around 5.3 at the $10^{-7}$ probability threshold.

In practical systems based on the IFFT/FFT pairing, various steps are taken to reduce the impact of its sensitivity to regular patterns of input data. These can readily occur in data sequences delivered to an encoder, especially in the case of ADSL where a fixed padding data pattern must be inserted when no user data is waiting to be transmitted. The problem of such regular patterns in the original data causing high peaks in the output of the IFFT is usually dealt with by performing a reversible "scrambling" operation on the data stream prior to encoding. Two examples of such scrambling mechanisms are self-scramblers and randomisers.

By applying scrambling processes to the input data, any regular patterns in it may be broken up. The distribution of the data bit values going forward into the encoder becomes more haphazard, and so the likelihood of coherence between the phases of the different tones is drastically reduced. This diminishes the frequency with which spikes appear in the time-domain signal, even for a completely regular input stream (e.g. all 1s), relative to that which would apply without scrambling. However, for more irregular input data, no particular change in the statistical properties of the IFFT output will occur.

One major problem with IFFT-based encoding, so far as the design of any practical system is concerned, is that the time domain signal created has characteristics which make it more difficult and/or more expensive to carry through the later stages of the transmission path. For example, the bandwidth of the signal may in some cases be as wide as can theoretically be carried by the discrete sample sequence. Any subsequent processing of the signal, post-IFFT, must therefore be carefully designed to minimise distortions of the signal caused by frequency-dependent variations (e.g. in gain or phase-shift), which are typically worst at the highest frequencies.

However, an issue of great concern is the high crest factor of a typical IFFT-generated signal. This leads to a number of difficulties in designing the circuitry in a modulator & transmitter for an IFFT-based modulation scheme. Some of the problems also occur in the design of a corresponding multi-tone receiving device.

The first problem is that the dynamic range of the digital-to-analogue converter (DAC) must be large, requiring a relatively high number of bits of resolution (typically between 14 and 16 for ADSL). This makes the DAC hard to design, especially since it is running at high sampling rates (in the order of 1–2 MHz or higher for ADSL, and higher still for COFDM). In a receiver for the transmitted signal, the input circuitry must also have a high dynamic range and low noise and distortion; equally its analogue-to-digital converter must have high linearity and resolution.

The second aspect, which is usually considered even more serious, is that it is extremely difficult to design the amplification stages of the transmitter to both yield the high linearity which is needed and also maintain good power efficiency. Because the amplifier (also called the "line-driver" in the case of ADSL) must be able to handle signal peaks several times higher than the average signal level on the line, it becomes necessary to run its power supply at a far higher voltage than the average signal level would require, if the signal's crest factor were lower. Typical power efficiencies for amplifiers in present-day ADSL system designs are therefore significantly lower than in some other types of transmission system e.g. 15–20% as against 40% or more.

Accordingly, it would be desirable to reduce the crest factor, compensate for its effects, or both.

WO99/18662 to Ericsson describes one approach to minimise effects of peaks in transmitted power in a multi-carrier DSL-type transmission system. In this arrangement, an amplifier circuit arranged for driving the line from an analogue input has two power supplies, of higher and lower voltage. A controller causes power to be supplied from the lower voltage power supply when the magnitude of the input signal is less than a threshold, and from the higher voltage power supply when the magnitude of the input signal is higher than the threshold.

Unfortunately, the signal and sampling frequencies involved in typical multi-tone transmission are very high, with sampling periods of order 50–500 nanoseconds. This period is very much less than the time it would take for a dual-supply amplifier to switch power supply voltage and resume stable operation at the new voltage. It is therefore difficult to design an amplifier of this sort in a way which avoids both transient distortions and the introduction of noise at the moment of switching supply voltages. Practical amplifier designs intended to support more power-efficient multi-tone transmission therefore do not use such a technique, precisely to avoid such noise and distortion effects, which are likely to be seriously damaging to multi-tone signals. An example of an amplifier which supports dual supply operation, without using an explicit controlled hard switch-over, is described in "THS6032 Low power ADSL central-office line driver", (document ID SLOS233D, April 1999, revised May 2001, Texas Instruments Incorporated, Dallas Tex., USA). This design exploits "soft" or continuous transition between supply voltages (so-called "class-G Operation") even though this results in considerably lower power efficiency than might be obtained from the "hard" (instant) switching amplifier controlled by a separate control signal, such as WO99/18662 describes.

There thus remains a need to reduce or compensate for the crest factor in multi-tone systems.

SUMMARY OF INVENTION

According to the invention there is provided a modulation method for multiple-tone signalling using a system with an analogue front end, comprising the steps of: feeding a symbol data stream of multiple tone symbols to an analogue front end and to a model; in the model, modelling the peak amplitude that will be present in the symbol data stream after subsequent processing by the analogue front end; feeding forward a control signal based on the modelled peak amplitude from the model to the analogue front end; and outputting the symbol data stream through the analogue front end under the control of the control signal.

By modelling the peak value in the symbol data stream in advance of its actual transmission, it becomes possible to control the power utilisation of the analogue front end. Since the modelling is performed on symbol data which has not at that time been passed on to the AFE, it is possible to determine for a whole symbol what the maximum value in it is—and thus which supply voltage should be used—before the symbol even starts to be transmitted. If the supply must be switched for a symbol soon to be transmitted (either to increase or decrease voltage), the switch-over can therefore be arranged to occur, not at some arbitrary point in the symbol when a peak signal value occurs, but rather during the cyclic prefix, before the beginning of the main symbol period. Thus, the short-term corruption of the signal caused by power-supply voltage switching in the amplifier would not significantly affect correct reception of the symbol at the receiving modem, since the signal transmitted during the cyclic prefix period is deliberately ignored by the receiver.

Preferably, the analogue front end includes an amplifier such as a line driver operable from a plurality of different voltage levels and the control signal selects one of the plurality of different voltage levels in the line driver. In this way, maximum power efficiency can be obtained. Normally, a lower voltage power supply is used, to provide maximum power efficiency. However, when using this lower voltage supply the maximum signal amplitude which can be amplified linearly is limited, and an input level that is too high will cause unwanted clipping of the signal in the amplifier. Conversely, use of the higher voltage supply will allow higher signal amplitudes to be dealt with correctly, but will incur higher power consumption and hence lower efficiency.

Thus, the line driver or other amplifier can be switched to use a higher voltage supply when a larger signal amplitude will be received. Amplifiers cannot switch power instantly; some delay is incurred before the new supply is fully connected and available. Thus, by predicting the power in the symbol in advance it is possible to make the change-over at a convenient time when the delay will not cause significant corruption of the transmitted signal.

Moreover, the system can also compensate in the model for any preprocessing provided in the analogue front end.

The control signal need not be used solely to control an amplifier. The signal may also be used to influence preprocessing of the symbol data stream, or even the digital to analogue conversion.

For example, if the peak value in a given symbol is lower than a particular threshold, some of the pre-processing steps in the AFE for that symbol could be performed using arithmetic operations in which all values are temporarily scaled upwards by 1 bit (or even 2 bits) and scaled back to the original level afterwards, since it can be known that such scaling will not cause arithmetic overflow. In this way, the errors in the computation (which arise inevitably in finite precision arithmetic) may be proportionately reduced, and hence the noise properties of the transmitted symbol will be better than they would have been without such scaling. Likewise, it would be possible to reduce the required effective dynamic range of the DAC by pre-scaling its inputs in accordance with each symbol's peak level—known in advance—and adjusting the gain of a programmable analogue driver stage which follows it, in order to compensate. As with control of the line driver power supply, the gain change would be arranged to occur during the cyclic prefix time, to avoid any disturbance to the main symbol time.

Furthermore, the method may also applied in a system which processes an input data stream through a plurality of intermediate processing stages and corresponding stages of intermediate data to generate the symbol data stream. If the modelled peak amplitude in a particular symbol in the symbol data stream exceeds a predetermined threshold, the intermediate data can be amended such that the input data is still represented by the intermediate data, and the subsequent intermediate processing stages on the intermediate data carried out to regenerate a symbol in the symbol data stream, and replace the particular symbol with the regenerated symbol.

In this way, the crest factor of the symbol data stream can be reduced. The inventor has realised that significant perturbations in the values of the input vectors for the IFFT, sufficient to cause the modified symbol to take a shape substantially different from the original one, can be accomplished by quite small and simple changes to the data being processed within the encoding system prior to the IFFT input stage. When a symbol is detected whose final (time-domain) signal shape contains a peak higher than the threshold level, all or part of the processing of data which was performed in order to create that symbol is re-executed, this time making a change to some item of data which contributes to the symbol. If the resulting re-generated symbol has a lower peak value than the threshold, all is well and the revised symbol is sent. Depending on circumstances, (e.g. as determined by the availability of required resources such as processing cycles and buffer memory) if the peak value of the new symbol is still no lower than it was, or still above the threshold, further attempts at re-generation may be made, using other changes in the data.

By using the model of the processing subsequently carried out in the AFE in this way, symbol regeneration to reduce the crest factor can be performed even in the presence of oversampling or of other filters or elements in the analogue front end that affect the transmission of symbols from the IFFT module to the transmission line. It is not necessary to introduce extra complexity by defining new, relatively expensive special operations on the IFFT input vectors in order to achieve the goal. Nor is it necessary to pass a separate indication along with the main data in the symbol, to allow the receiver to reverse the process and recover the user data. Instead all that happens is that a small modification is made to some intermediate data item in the set of data items which were encoded to create the symbol, followed by a 1s repeat of the normal data processing for transmission, using exactly the same steps as were performed the first time the symbol was encoded (and which any transmitting modulator would perform). Thus the receiver can be left completely unaware that the transmitting modem is implementing this scheme; it has nothing different to do. The same amount of user data can be transmitted, in exactly the same way as before, and no extra information has to be transmitted. This avoids the difficulties of a prior scheme set out in U.S. Pat. No. 5,768,318.

Accordingly, in embodiments the modelling of subsequent processing is not used just to influence processing in the analogue front end, but also to reduce the crest factor. Thus, the effects of high crest factor are reduced both by reducing the crest factor and reducing the effects of the crest factor.

The invention relates to apparatus for carrying out this method as well as to a computer program product for implementing the method.

BRIEF DESCRIPTION OF THE DRAWINGS

Embodiments of the invention will now be described, purely by way of example, with reference to the accompanying drawings, in which.

SPECIFIC DESCRIPTION

Figure 1:
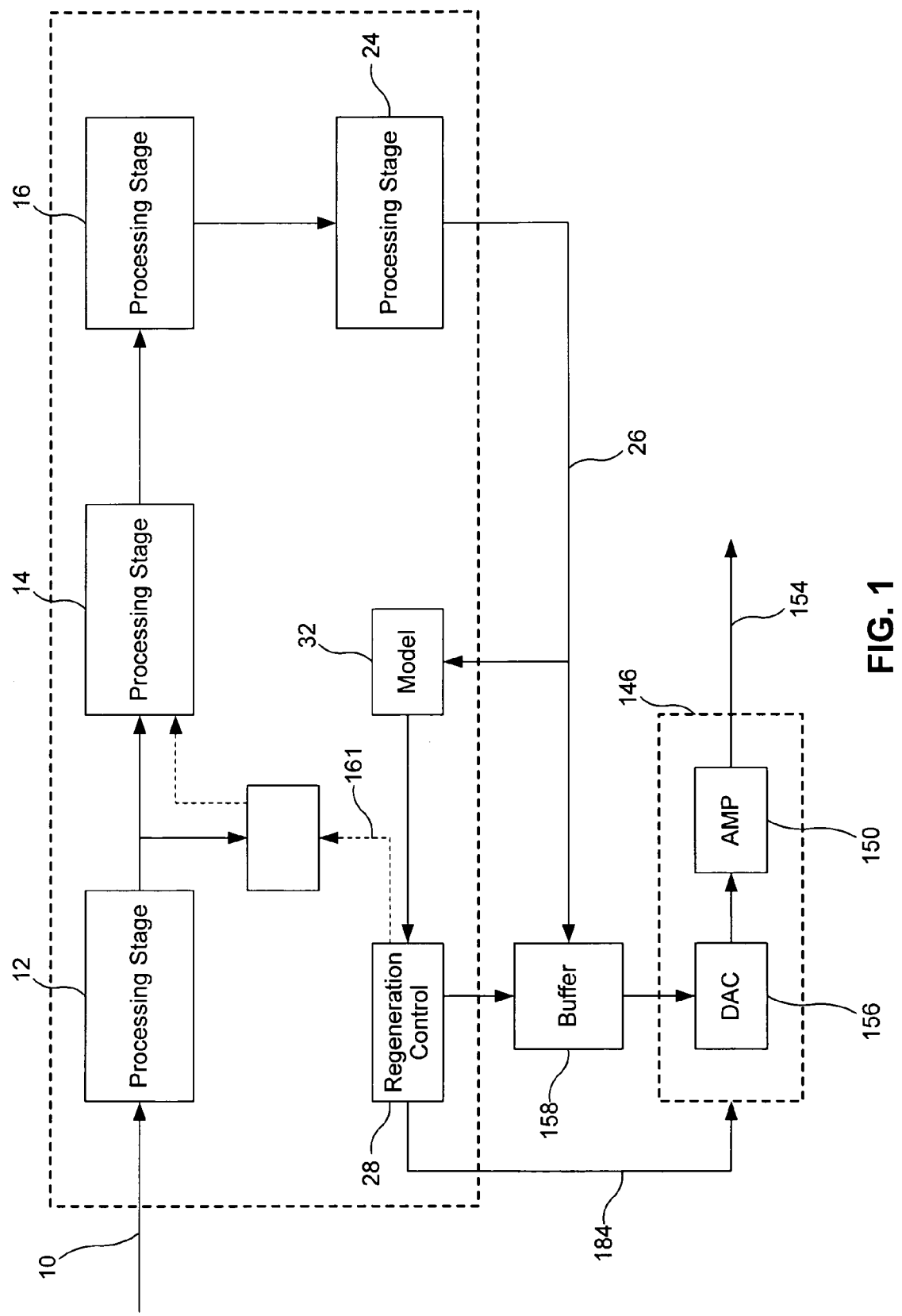
FIG. 1 shows a block diagram of a first embodiment of the invention.

FIG. 1 shows a schematic diagram of a first embodiment of an apparatus according to the invention.

A digital data stream 10 is fed into a modulator 126 where it passes through a plurality of processing stages 12, 14, 16, 24. The output of these processing stages is a symbol data stream 26 including multi-tone symbols, and is stored in a buffer 158.

This symbol data stream is delivered from the buffer 158 to analogue front end 146 which contains a digital to analogue converter (DAC) 156 and a line driver, i.e. an amplifier 150. The line driver drives line 154, which may typically be a telephone line or other suitable interconnection or networking line.

The symbol data stream 26 is also fed in the modulator 126 to a model 32. The model models the processing subsequently to be carried out in the analogue front end 146. The model 32 determines the peak amplitude the symbol will contain after passing through the analogue front end 146 and outputs a corresponding control signal 184 to the analogue front end 146.

This control signal is used to control the analogue front end 146 in accordance with the derived symbol peak amplitude.

By modelling the performance of the analogue front end 146 the subsequent symbol peak amplitude becomes available earlier than it would be from simple measurement within the analogue front end. Accordingly, there is more time to adapt the properties of the analogue front end to the symbol data stream.

It is not essential that the analogue front end 146 only includes the DAC 156 and line driver 150. The skilled person will realise that many other components may also be included. In particular, preprocessing 160 may be provided in the analogue front end 146, for example to oversample the incoming symbol data stream 26 to improve the digital to analogue conversion.

Optional embodiments of the invention include regeneration control 28 to pass information back along signal path 161 to regenerate a symbol stored in the buffer 158 when the model 32 predicts too high a peak amplitude.

The invention may also allow the control signal 184 to control the properties of other stages, such as AFE preprocessing stages, and/or of the digital to analogue converter.

It is not essential that the line 154 is a phone line. Many other types of line are suitable for use in the present invention.

The present invention may be applied to ADSL modems. Alternatively, the invention may be applied to alternative multi-tone signalling systems, such as COFDM (Carrierless Orthogonal Frequency Division Multiplex), a standard widely adopted for digital terrestrial TV broadcasting.

A second embodiment will now be described, specifically with reference to an ADSL system, illustrated in FIG. 2. A modulator 126 feeds data through a buffer 158 into the analogue front end 146 which contains a preprocessor 160, a DAC 156 and a line driver 150 to drive the line 154.

The modulator 126 includes a model 32 and a control output 172. The purpose of the model 32 will be described later.

In particular embodiments of the invention, the line driver 150, i.e. the final amplifier, is connected to a low voltage power supply 178 and to a high voltage power supply 180. A switch 182 switches the power supply to the line driver 150 between low voltage power supply 178 and high voltage power supply 180. The control signal 184 on control line 174 controls the switch 182 to normally use the low voltage power supply 178 but to switch the high voltage power supply 180 when a symbol amplitude peak on the symbol data stream is too high to be successfully or safely driven from the low voltage power supply 178.

In this way, the power supply can be managed to optimise the power efficiency. The high efficiency, low voltage power supply 178 is normally used. The high voltage power supply 180 is used only when required since the amplifier consumes more power when running at the high voltage.

By providing advance warning of the high symbol amplitude it becomes possible to switch to the high voltage power supply 180 at a convenient time (e.g. in the inter-symbol gap time).

It is not essential that the switch is switched on a symbol by symbol basis. The model 32 may include software to determine whether to switch the switch not merely on the peak amplitude in one symbol but that on adjacent symbols. This is because, at the margins where the high voltage or the low voltage power supply may be required, it may be the case that a sequence of symbols with peak amplitudes near the threshold level would require the use of the high voltage power supply, whereas an isolated symbol at that level could be successfully transmitted using the low voltage power supply. This will of course depend on the properties of the line driver 150 which may be readily determined by the skilled person.

In embodiments, the line driver 150 may be implemented as one chip and a further chip 151 carries the preprocessing block 160 and digital to analogue converter 156.

Figure 2:
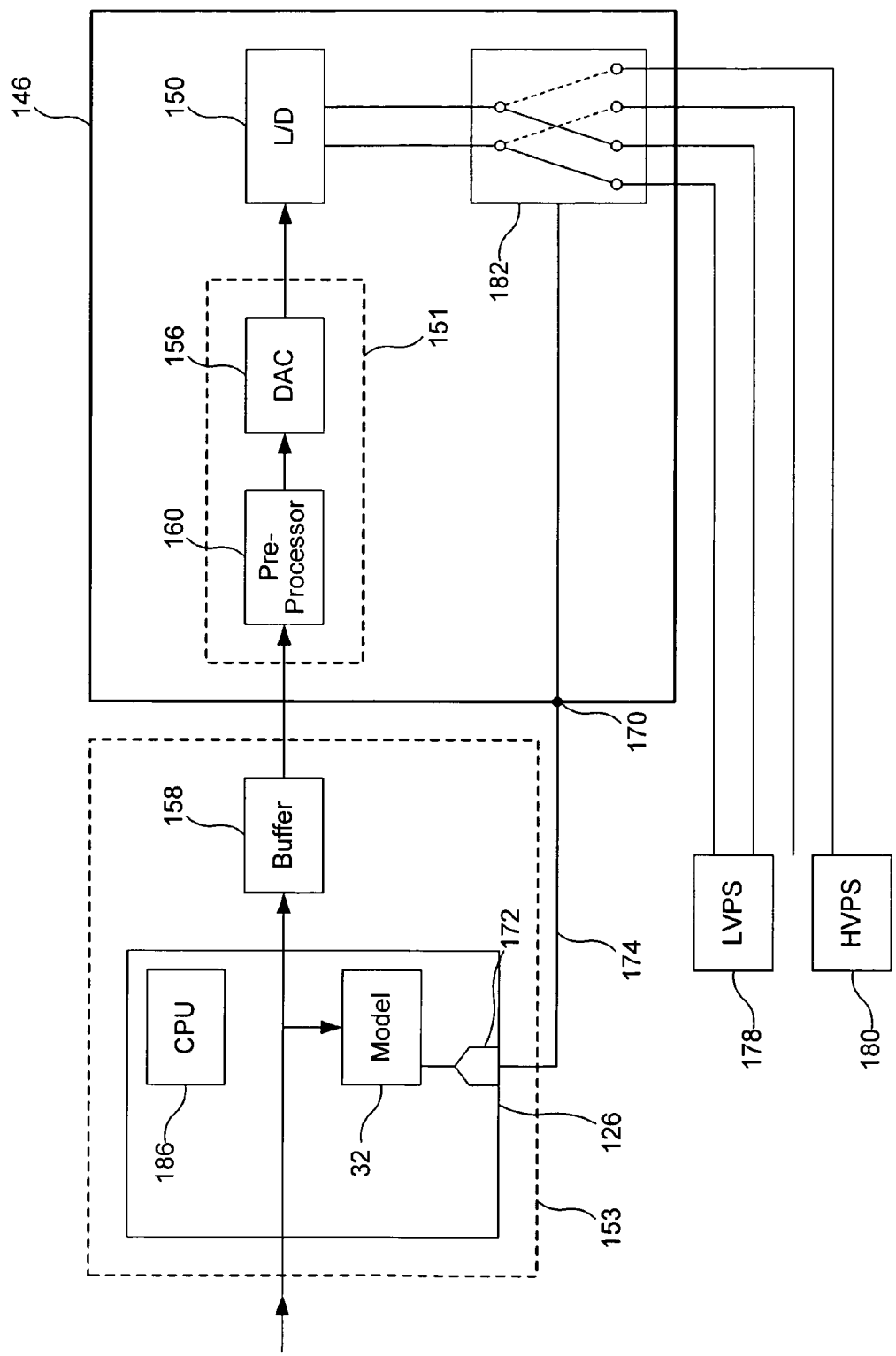
FIG. 2 shows a block flow diagram of a second embodiment of the invention.
Figure 3:
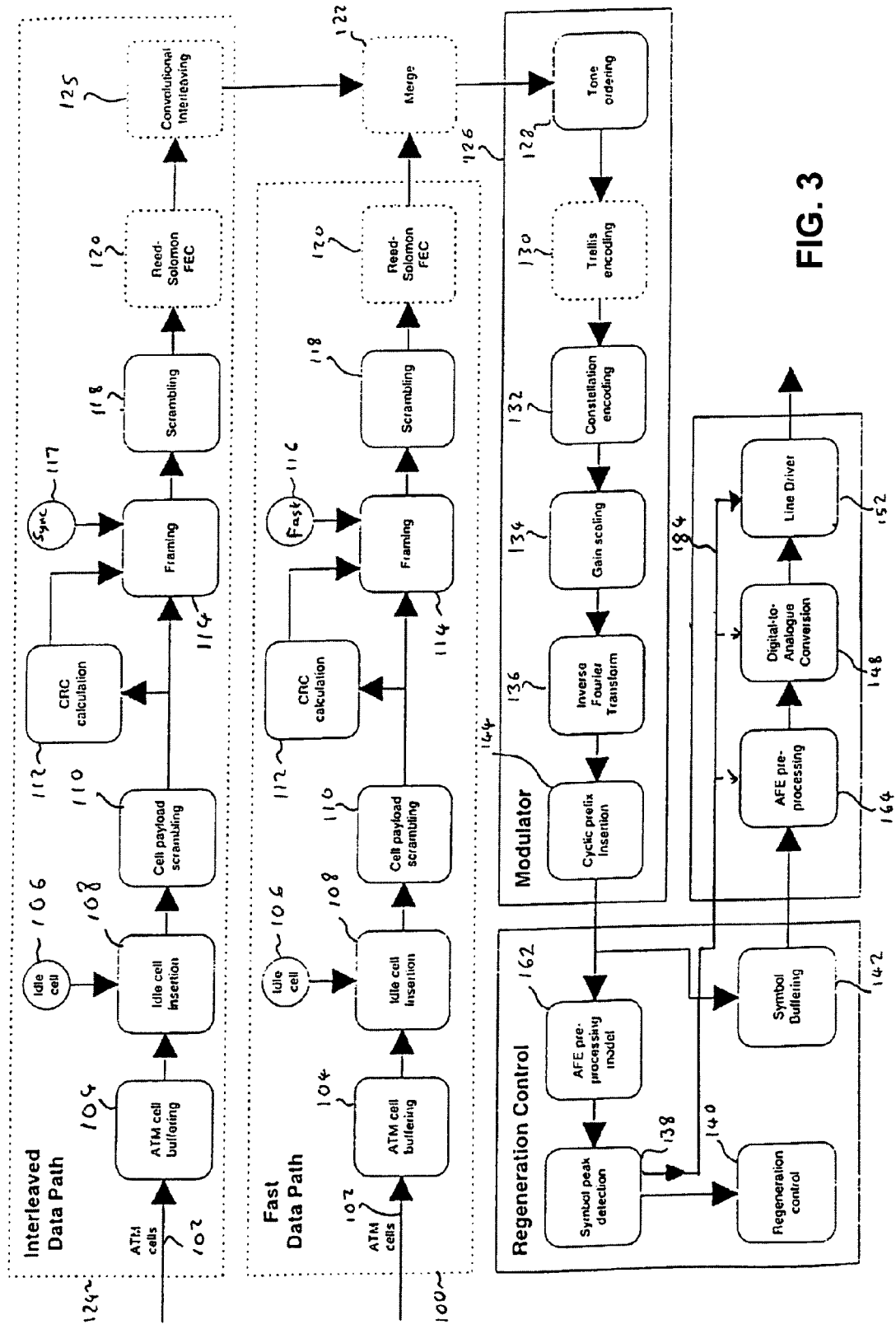
FIG. 3 shows a block diagram of a transmitter implementing the second embodiment.

FIG. 3 shows a flow diagram of the use of the ADSL modem of FIG. 2 to transmit an input data streams of ATM cells 102. In a first data path 100, the cells are buffered 104, and idle cells 106 are inserted 108 as required. The cell payload is then scrambled 110, and a cyclic redundancy check 112 performed. The ATM cells are then combined by framing 114, adding fast bytes 116 where required. Scrambling 118 is then performed, followed optionally by Reed-Solomon Forward error correction 120.

Another, interleaved data path 124 is also shown, having the same steps except that sync bytes 117 are used instead of fast bytes 116, and there is additionally a final step of convolutional interleaving 125.

The cells of the two data paths 100, 124 can then be merged 122. As will be appreciated, it is not essential for there to be any particular number of data paths and the merging step 122 is only required where there are a plurality of paths.

The framed, merged and scrambled ATM cells are then passed to the modulator 126 which carries out the steps of tone ordering 128, optional trellis encoding 130, constellation encoding 132, gain scaling 134, and inverse Fourier transform 136 to produce a stream of symbols each encoding some part of the ATM cell stream.

Until this point, all of the operations are conventional and well known to those skilled in the art.

Cyclic prefixes are inserted (step 144). The symbols including prefixes are then passed to the symbol buffer 158 for buffering 142, and also to a modelling step 162, to be described below. In many prior art arrangements, cyclic prefix insertion 144 is carried out after symbol buffering 142, but including cyclic prefix insertion at an earlier stage avoids the need to include the insertion of cyclic prefixes into the modelling of the analogue front end.

The output from the symbol buffer is passed to the analogue front end 146. This carries out preprocessing 164. In embodiments, the preprocessing includes signal filtering (optional) and oversampling; in oversampling the sample rate of the incoming stream is increased, typically by a factor of 2, 4 or 8 relative to the sample rate emerging from the buffer 158. Normally, the oversampling function includes a low-pass filter; it and any signal filtering functions inevitably cause some changes in the relative phase and amplitude of the individual tones of the symbol.

The oversampling eases the subsequent signal processing, in particular the next step of the digital to analogue conversion 148. Finally, the analogue signal is used to drive the line (step 152) using line driver 150.

The AFE preprocessing model 32 models 162 the effect on the symbol of the AFE preprocessing 164, including the oversampling and any filtering. Since the AFE preprocessing is generally carried out in the digital domain, the skilled person will not have any difficulty in modelling the preprocessing.

For example, as long as there is sufficient processor power in the modulator 126, the same processing can simply be carried out on the symbol as will later be carried out in the AFE. The modelling of the preprocessing will accordingly not be described further.

The peak value of the modelled symbol can then be detected (step 138). If the peak is above a predetermined value then regeneration of the symbol is performed, under regeneration control 140. The ways in which this is done will be described in more detail later.

Note that the peak value is to be detected after any regeneration attempt or attempts have been completed. The power supply switch decision is accordingly based on the modelled peak amplitude in the final, possibly regenerated buffered symbol, not on any earlier generated version of that symbol. Since the threshold for power supply switching will normally be lower than the regeneration attempt threshold, regeneration will normally be attempted first, in any case where switching to the higher power supply would apparently be needed.

The line driver 150 (FIG. 2) is arranged to run on two power supplies, a low voltage power supply 178 at 5V and a high voltage power supply 180 at 12V. A switch 182 normally supplies low voltage power from low voltage power supply 178, but can be switched to supply high voltage from high voltage power supply 180 instead. As the skilled person will appreciate, these voltages may vary depending on the application.

A control input 170 is provided on the AFE 146 connected to control output 172 on the modulator by a control line 174. The modulator compares the peak amplitude in the symbol data stream with a predetermined threshold and if the power exceeds a predetermined high voltage threshold then the modulator outputs a control signal 184 through control output 172, control line 174 and control input 170 to control the switch 182 to supply the line driver 150 with the higher voltage power supply 180. The threshold is not necessary the same threshold as that used to trigger regeneration. Indeed, the threshold will normally be lower.

Thus, in a modulator according to this embodiment, the effect of the crest factor is reduced in two ways. Firstly, the low efficiency caused by the crest factor is improved by allowing the line driver 150 to operate in a low voltage, high efficiency mode for most of the time, only reverting to a high voltage, low efficiency mode when required. Also, the crest factor itself is reduced by regenerating symbols when the final input to the line driver would otherwise have a peak level greater than the desired maximum level.

The approach allows the AFE module to be a separate module, as presently common. The AFE is not required to carry out either determination of the power nor symbol regeneration processing. If instead of using the approach of the embodiment the pre-processing were to be carried out in the modulator, oversampled data would have to be transferred from the modulator to the DAC 156 in the AFE. An increase in data transfer rate over the already high rate would typically cause more power to be consumed in the modulator output drive circuitry, increase local electrical noise, and generally make achieving system design goals more difficult.

In the embodiment, the preprocessing 160 and DAC 156 units of the AFE 146 are implemented in one chip 151 and the modulator 126 and buffer 158 in another 153; the line-driver 150 is a third separate device.

The digital modulator 126 is built on a small geometry, more expensive process, so as to keep its size down and maximise digital processing speed. The preprocessing and DAC units of the AFE 46 are built on a larger-geometry, but cheaper and slower silicon process, which makes the design of analogue elements easier, and reduces the chip's cost.

The modelling unit 162 in the modulator, in this example, is chosen to be another instance of the preprocessing unit 160 in the AFE 146. However, because of the smaller geometry, it takes up less space. Since it is on the faster modulator chip 126, it can be clocked much faster.

Further, practical implementations of the invention may include multiple output channels. Since digital logic (including the preprocessing unit 160) in the AFE 146 is generally clocked more slowly than the modulator 126, and for other reasons, one physical copy of the preprocessing circuitry 160 is then used in the AFE for each output channel supported, rather than multiplexing the circuitry across different channels. However, in the modulator 126, the faster clock speed allows the modelling circuitry 162 to be time division multiplexed across multiple channels, thereby saving space. Thus, the overhead associated with the duplication of the preprocessing circuitry 160 as the modelling unit 162 may be less than would at first be thought.

The preprocessing model 162 may in alternative embodiments be conveniently stored as data in a memory for controlling a central processor 186 of the modulator. The preprocessing model used can readily be adapted for different analogue front ends simply by changing the model in software.

Note that each functional block shown in the FIGS. 2 and 3 within the Data Path modules, the Modulator module and the Regenerator Control module, could in principle be implemented either by hardware or by software, or by some combination of the two. The AFE module normally uses hardware blocks for its functions.

The actions carried out to regenerate symbols which exceed the predetermined peak value will now be described in more detail.

Fast Byte/Sync Byte "X" Bits

The single most valuable point at which data changes can readily be performed is in the "fast" and/or "sync" bytes which are defined to occur in ADSL data symbols. The fast and sync bytes are overhead bytes, not themselves part of the stream of data (usually an ATM cell stream) to be carried over the link, but associated with it, and physically carried as a part of the modulated signal. Depending on configuration, in many (though not all) ADSL data symbols, they contain control information used to manage the synchronization of data streams being transported over the ADSL link which were originated via a communication path whose control clock is asynchronous to the ADSL modem's own control clock. However in many practical systems using ADSL modems, this capability is not required. Even where it is needed, it may actually be applied only rarely, leaving the byte available for application of the technique described here, most of the time.

When a fast or sync byte is not carrying synchronization control values, it is defined to carry values of a fixed pattern, of the form XX0011X0 for the fast byte and XX0011XX for the sync byte. The bits shown as X can be freely set to either 0 or 1 as desired. With three or four bits whose value may be changed at will, there are a total of 8 or 16 possible combinations of 1s and 0s which may be created; therefore up to 7 or 15 attempts to re-generate a symbol are possible. This is more than adequate, in general.

Depending on configuration, fast bytes occur at the start of many (e.g. 64 out of every 68) data frames of ADSL when "fast" (low latency) data streams are used. Changes in any X bit of the fast byte will cause much larger scale changes in the symbol because the stream scrambler is applied to this byte first in the fast data stream, so the scrambled form of almost all subsequent data bytes in the fast stream (but not the interleaved stream if also present) will in general be altered. Reed-Solomon encoding (if applied) also follows the scrambler so the added R-S parity bytes will in general take different values. Finally, the trellis encoder (if applied) will also cause changes to the output stream, because of any change in its input, over a given frame. Furthermore, since the fast byte is the first byte in each whole data frame (including also the interleaved data if present), this means that the trellis encoding of all or almost all tones in the symbol is liable to be modified by a single bit change in the fast byte.

Sync bytes occur within most frames when interleaved streams are used. As with the fast byte, changes in any X bit of the normal sync byte pattern will affect all subsequent bytes in the interleaved portion of the data frame, through the application of the stream scrambler to the interleaved stream. However if the convolutional interleaver is applied, then older data from the interleaver's buffer, which will also appear in the final encoded symbol, will not be affected by the change; thus changes to the sync bytes are less effective. However, if trellis encoding is in use, then all output data of the trellis encoder, starting from the interleaved part of the frame, will still be affected by a change in the sync byte.

Both fast and sync bytes occur in many frames in a "dual latency" system where both fast and interleaved streams are active. In this case, either or both fast and sync bytes may be changed (a total of up to 7 X bits) to effect a significant change in the final time domain form of the encoded symbol.

The principal limitation of this method is that in some cases, the fast or sync bytes are not available—4 data frames (symbols) out of the 68 data frames in each ADSL "superframe" structure are defined not to carry them (the byte location in the frame is used for a different purpose in these frames), and in systems where synchronization must be performed, these bytes may occasionally carry values other than the default pattern with its three X bits. In most configurations, the fast and sync byte locations in the ADSL data frame are shared with use for other purposes, though these will generally be infrequently used; additionally one configuration reduces the number of frames carrying fast and/or sync bytes to 32 (rather than 64) out of every 68. If it is desired to modify the data and regenerate the symbol in these cases also, some other method must be found; alternative methods are given below.

Idle Cell Payload Modification

Of all possible techniques for changing data in an ADSL modem in order to cause symbol re-generation, changing data in the payload bytes of an ATM cell, as seen at the input end of the transmitter-side processing, has the greatest possible "spreading" effect. This is because the largest number of steps, each of which causes spreading, will subsequently be applied to the data: (a) the payload bytes in the cell are scrambled; (b) the composite stream is then scrambled again; (c) Reed-Solomon error protection may optionally be applied to the stream; and (d) trellis encoding may optionally be applied to the stream while creating the IFFT input vectors. Even if no R-S encoding or trellis encoding is used, the two sequential scrambling processes are enough to cause a huge spreading effect on the data. Therefore, if even one bit of a cell's payload is changed, the regenerated data at later stages of the ADSL processing sequence will in general be very different, resulting in an equally significant change in the time-domain signal created, and hence (by probability) a high likelihood of creating a new symbol with a lower peak value than the original one.

However, in general, it is not desirable to change the user data—the purpose of the modem is faithfully to transmit exactly that data with which it was supplied, over the link to the other end of the ADSL connection. Therefore it is strongly preferred, not to modify that data. However, idle cells can provide a way to achieve the effect of the invention, without damage to real user data.

Idle cells are ATM cells of a special reserved type, which are used to pad out a data stream. Idle cells are defined by a particular fixed pattern in the cell header—this is how they are recognized as idle cells when received. The payload of an idle cell is also defined as a fixed pattern, the same in every byte. In ADSL, the transmitting section of each modem is obliged to insert idle cells into the data stream whenever no user data cells are available to be transported. This is required because the physical data rate of a standard ADSL link is fixed at initialisation, and is maintained until the line is shut down or re-initialised. Since it is not possible to send "no data" when no user data is present, idle cells are sent instead, to maintain the flow. At the receiving end, idle cells are simply discarded—their contents are not related to real user data carried by the connection.

This observation provides another method of changing the data stream, for symbols where it is desired to re-generate because of a peak above the specified threshold in the encoded time-domain version of the symbol. What can be done is to check whether any byte of data carried by the symbol is part of the payload of an idle cell, and if so, to make a modification in that byte. Because the payload of idle cells is ignored by the receiver, any bit of the 8 in the byte can be modified, allowing up to 255 possible modifications (relative to the original value) to be tried out—this is far more than enough! In general, to achieve maximum effect, the earliest available idle-cell payload byte in the data for the symbol should be so modified, since all modifications affect (by spreading) only the encoded form of later bytes in the stream (and hence, that portion of the stream which is carried in the rest of the symbol).

Most installed ADSL connections only carry user data for a small proportion of the time, when considered on a long term basis; so idle cells will be very common in general. Since an idle cell does not contain any user data, its payload is not of interest, being fixed. Changing any bit in the payload of an idle cell will have no effect on the user data also carried by an ADSL connection.

This method is therefore applicable in many cases. Only when the line is fully occupied with user data at the time, such that no byte in the data carried in the particular symbol to be regenerated is part of an idle cell's payload, will this technique not work. But since on a long term statistical basis, most bytes of data carried over ADSL lines will be idle cell payload bytes, this method will frequently be available.

One proviso to this method is that one way of checking the error rate on an ADSL link, sometimes employed for purposes of link maintenance and management, is for the receiving modem to examine the payload bytes of idle cells before it discards them, comparing each byte against the fixed value it is defined to hold in any idle cell. Any errors found in the comparison are assumed to have arisen as a result of uncorrected errors in transmission of the data stream over the ADSL link. Some modems keep count of the error rate on this basis (measured as a moving average of the number of bits in idle cells which are found to be incorrect, divided by the total number of bits in the idle cells seen, over some measurement interval). In such cases, the deliberate introduction of changes to idle cell payload bytes will give rise to an incorrect assessment of the true error rate by the receiving modem. In the worst case this may trigger an attempt to re-configure or re-initialise the link, so as to maintain the apparent error rate below the required maximum level.

Clearly it is useful to guard against such behaviour. One possible method is to define a limited set of modifications to idle cell payload bytes which can be attempted by the transmitting modem. Instead of the standard fixed payload byte value, a small number of alternative values (say, 3 out of the 255 remaining possibilities, or even just one value) could also be considered to be "legitimate" in idle cell payloads. In such a scheme, the receiving modem would be modified so as not to count such values in idle cell payloads as being errors, for purposes of error rate calculation. This modification still allows a high rate of true error detection, since the probability that a randomly corrupted idle cell payload byte takes one of 4 specific allowed values out of the 256 possible ones is only 1/64, or 1/256 if just one alternative value is allowed. Therefore with random, even error distribution, the true error rate and the measured one would differ by at most 6.25%, well within an appropriate level of accuracy in this context; furthermore in long term measurements it is possible to compensate for this difference.

Cell Swapping

As an alternative to modifying the contents of (idle) ATM cells, another method to cause a change in the data stream so as to allow symbol regeneration is to physically replace one ATM cell by another. For the reasons already identified, this will in general give rise to a large change in the encoded time-domain form of the symbol. This type of technique can be applied to any symbol where the data it carries includes the start (first header byte) of an ATM cell. Various possibilities are available:

(a) If the start of an idle cell was encoded in the original form of the symbol because no data cell was available for transmission as processing for that symbol was started, and if when the processing has been completed it is found that the encoded time-domain symbol should be re-generated, a check should be made as to whether a new data cell has become available; if so then the idle cell can be discarded and replaced with the data cell.

(b) If the total ATM cell stream being carried over the link contains cells with different ATM addresses in their headers (which form logically distinct streams based on the addresses) and if at the time when symbol regeneration is required a new cell with a different address from that of a cell starting in the originally encoded symbol is also available for transmission, then the two cells can be swapped and the symbol regenerated using the second cell. This should not normally be done if the first cell was marked as being of higher priority than the first, or if the first cell had been waiting to be transmitted for much longer than the second.

(c) If the line is currently running at well below full capacity, (i.e. there is a strong likelihood of inserting an idle cell in the near future, based on the state of the ATM cell buffering at the input to the transmit side of the modem) and if the current symbol, containing the start of a user data cell, is to be re-generated, then an idle cell may be substituted for that data cell, and the data cell replaced at the head of the queue of cells awaiting transmission. This type of change should be attempted only if all other methods are inapplicable, since it causes a delay to the cell's transmission. In addition it should not be used if the cell concerned is marked as high priority.

As shown above, there are a number of viable ways of implementing the invention for ADSL, while maintaining correct operation of the system as a whole, without requiring the receiver to have any knowledge of the process at all, and in a completely standards-compatible manner. Additionally, very minor changes to the standards-defined processing (such as the allowance at the receiver of one or a small number of alternative legitimate values for the bytes of an idle cell payload) usefully extend the range of possible options for symbol regeneration.

As mentioned above, although the above embodiment is described with reference to an ADSL system, the invention is not limited to ADSL, and indeed the ideas of the invention may be applied in any multiple tone signalling process.

I claim:

1. A modulation method for multiple-tone signalling using a system with an analogue front end, comprising the steps of:
feeding a symbol data stream of multiple tone symbols to a model and to a buffer for onward transmission to the analogue front end;
in the model, modelling the peak amplitude that will be present in the symbol data stream after subsequent processing by the analogue front end;
feeding forward a control signal based on the modelled peak amplitude from the model to the analogue front end; and
outputting the symbol data stream from the buffer through the analogue front end under the control of the control signal so as to avoid passing, along with the symbol data stream, separate information required by a receiver to demodulate the symbol data stream.

2. A method according to claim 1 wherein the analogue front end includes an amplifier operable from a plurality of different voltage levels, and wherein the control signal selects one of the plurality of different voltage levels in the amplifier.

3. A method according to claim 1 including preprocessing the symbol data stream in the analogue front end, and modelling the preprocessing in the model.

4. A method according to claim 3 wherein the modelling is carried out separately on each symbol.

5. A method according to claim 4 further comprising processing an input data stream through a plurality of intermediate processing stages and corresponding stages of intermediate data to generate the symbol data stream; and
if the modelled peak amplitude in a particular symbol in the symbol data stream exceeds a predetermined threshold, amending predetermined intermediate data such that the input data is still represented by the intermediate data, carrying out the subsequent intermediate processing stages on the intermediate data to regenerate the particular symbol in the symbol data stream, and replacing the particular symbol with the regenerated symbol.

6. A multiple tone modem comprising:
a modulator for generating a symbol data stream of multiple tone symbols;
an analogue front end for processing the symbol data stream, the analogue front end including a digital to analogue converter and a line driver for driving a line; and
a model for processing the symbol data stream to predict the amplitude peaks present in the symbol data stream after subsequent processing by the analogue front end and for feeding forward a control signal based on the modelled amplitude peaks to the analogue front end;
wherein the analogue front end includes a control input for accepting the control signal and the analogue front end processes the symbol data stream under the control of the control signal so as to avoid passing, along with the symbol data stream, separate information required by a receiver to demodulate the symbol data stream.

7. A multiple tone modem according to claim 6 wherein the analogue front end includes a line driver connected to a plurality of different power supply voltage levels and the control signal selects one of the power supply voltage levels based on the amplitude peaks in the symbol data stream.

8. A multiple tone modem according to claim 6 further comprising a data buffer between the modulator and the analogue front end.

9. A multiple tone modem according to claim 6 wherein the analogue front end further comprises a preprocessing module for preprocessing the symbol data stream, and wherein the model models the preprocessing.

10. A multiple tone modem according to claim 8 wherein the model models the peak amplitude separately for each symbol in the symbol data stream.

11. A multiple tone modem according to claim 10 wherein:
the modulator includes a plurality of intermediate processing stages for processing an input data stream through a plurality of stages of intermediate data and generating the symbol data stream; and
the modulator further comprises a regeneration control system actuated if the modelled peak amplitude in a symbol exceeds a predetermined threshold to amend predetermined intermediate data such that the input data is still represented by the intermediate data, and to carry out the subsequent intermediate processing stages on the amended intermediate date to regenerate a replacement symbol.

12. A multiple tone transmission system comprising:
a transmitter including a modulator for generating a symbol data stream of multiple tone symbols,
an analogue front end for processing the symbol data stream, the analogue front end including a digital to analogue converter and a line driver for driving a line; and
a model for processing the symbol data stream to predict the amplitude peaks present in the symbol data stream after subsequent processing by the analogue front end and for feeding forward a control signal based on the modelled amplitude peaks to the analogue front end; and
wherein the analogue front end includes a control input for accepting the control signal and the analogue front end processes the symbol data stream under the control of the control signal so as to avoid passing, along with the symbol data stream, separate information required by a receiver to demodulate the symbol data stream;
further comprising a transmission line; and
a receiver connected to the transmission line to decode the transmitted data stream.

* * * * *